(12) United States Patent
Chang et al.

(10) Patent No.: US 10,930,441 B2
(45) Date of Patent: Feb. 23, 2021

(54) NITROGEN-DOPING POROUS GRAPHENE MATERIAL IN SUPERCAPACITOR AND PRODUCTION METHOD THEREOF

(71) Applicant: National Chung-Shan Institute of Science and Technology, Taoyuan (TW)

(72) Inventors: Chien-Liang Chang, Taoyuan (TW); Wu-Ching Hung, Taoyuan (TW); Jeng-Kuei Chang, Hsinchu (TW); Bo-Rui Pan, Changhua County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 59 days.

(21) Appl. No.: 16/283,833

(22) Filed: Feb. 25, 2019

(65) Prior Publication Data

US 2020/0273626 A1    Aug. 27, 2020

(51) Int. Cl.
*H01G 9/035* (2006.01)
*H01G 9/042* (2006.01)
*C01B 32/194* (2017.01)

(52) U.S. Cl.
CPC .......... *H01G 9/042* (2013.01); *C01B 32/194* (2017.08); *H01G 9/035* (2013.01); *C01B 2204/22* (2013.01); *C01P 2002/54* (2013.01)

(58) Field of Classification Search
CPC ........ H01G 9/042; H01G 9/035; H01G 9/025; H01G 9/038; C01B 32/194; C01B 2204/22; C01B 2002/54
USPC ................. 361/502, 503, 508, 516; 29/25.03
See application file for complete search history.

(56) References Cited

U.S. PATENT DOCUMENTS

2002/0041997 A1* 4/2002 Muffoletto .......... H01M 2/0275
429/218.1
2016/0254102 A1* 9/2016 Ruoff ..................... H01G 11/34
252/502

\* cited by examiner

*Primary Examiner* — Arun Ramaswamy
(74) *Attorney, Agent, or Firm* — Winston Hsu

(57) ABSTRACT

In this patent, a high energy and power density supercapacitor was invented. A coin cell with supercapacitor includes a spring lamination, a working electrode, a counter electrode, a separator, and an Organic electrolyte. The working and counter electrodes were Activated carbon/N-doping porous graphene/binder coated on Aluminum substrate. The separator was from Nippon Kodoshi Corporation. The Organic electrolyte was 1M TEABF4/PC. The method of producing N-doping porous graphene included the following steps: Step 1: Graphite oxide (GO) was transferred into the furnace. Step 2: Inject 50 c.c./min gas flow of Nitrous oxides for one hour. Step 3: Intensify 40 Celsius degrees/min to 900 Celsius degrees and after holding for one hour, lower the temperature naturally to the room temperature, it can be prepared into N-doping porous graphene. In this patent, the capacitance of the supercapacitor is 122 F/g and the power density is 31 kW/Kg.

6 Claims, 5 Drawing Sheets

|  | Non-doping graphene | Nitrogen-doping porous graphene |
|---|---|---|
| C (at%) | 90 | 89 |
| O (at%) | 10 | 8 |
| N (at%) | 0.0 | 3 |

FIG. 2

| Current density (A/g) | Activated carbon | Activated carbon with graphene | Activated carbon with nitrogen-doping porous graphene |
|---|---|---|---|
| | Capacitance (F/g) | | |
| 0.5 | 123 | 121 | 122 |
| 0.8 | 120 | 118 | 117 |
| 1 | 119 | 116 | 114 |
| 2 | 111 | 104 | 111 |
| 3 | 105 | 95 | 105 |
| 5 | 98 | 81 | 100 |
| 8 | 87 | 64 | 96 |
| 10 | 82 | 57 | 91 |
| 12 | 77 | 52 | 85 |
| 15 | 71 | 46 | 77 |
| 20 | 61 | 36 | 69 |
| 25 | 52 | 29 | 62 |
| 30 | 44 | 24 | 57 |
| 35 | 38 | 19 | 53 |
| 40 | 30 | 15 | 47 |
| 50 | 21 | 9 | 40 |
| $C_{50}/C_1$ | 17% | 7% | 35% |

FIG. 4

NITROGEN-DOPING POROUS GRAPHENE MATERIAL IN SUPERCAPACITOR AND PRODUCTION METHOD THEREOF

BACKGROUND OF THE INVENTION

1. Field of the Invention

The present invention relates to a Nitrogen-doping porous graphene material in supercapacitor and production method thereof in which the supercapacitor has a high energy and power density.

2. Description of the Prior Art

Regarding electrode materials for energy storage elements, chemical doping technique is a useful and common method to adjust electronic characteristics of the graphene, i.e., doping different atoms (e.g., nitrogen atom) to the graphene to perform chemical modification, such that there are specific functional groups in the surface of the graphene to adjust the electronic characteristics of the graphene.

Nitrogen-doping graphene is made by chemical doping, wherein the carbon atoms in the graphene lattice are replaced by nitrogen atoms or functional group with nitrogen, the nitrogen atom and carbon lattice of the graphene in sp2 mixed track may share electron pairs to make chemical bond, such that there are functional groups in the surface of the graphene to form the Nitrogen-doping graphene. Since the nitrogen atom has a characteristics of strong electronic negativity, it influences neighboring carbon atoms to cause chemical characteristics change of the graphene.

Due to the doping effect of the nitrogen atoms to cause chemical characteristics change of the graphene, in performance, the Nitrogen-doping graphene has many characteristics different from pure graphene, such as higher conductivity, energy band change, higher electrocatalytic activity, and so on. Therefore, the Nitrogen-doping graphene is applicable and widely developed in many fields including field effect transistor, Lithium-ion battery, fuel cell, photocatalyst, sensors and supercapacitor.

Currently, the production method of the Nitrogen-doping graphene may be classified into direct synthesis and post synthesis treatment. Direct synthesis means using small molecules including carbon or nitrogen to directly synthesis the Nitrogen-doping graphene, this kind of method includes Chemical vapor deposition (CVD), Arc-discharge, Hydrothermal etc. While post synthesis treatment means processing Graphene oxide (GO) or graphene to process with processing methods such as plasma treatment, hydrazine hydrate treatment or thermal treatment with high activity and energy to perform chemical modification. In the above-mentioned processing methods, nitrogen compounds such as ammonia, pyridine, acetonitrile, melamine, and urea are commonly used to perform chemical modification, in which the carbon atoms in the original lattice are replaced by nitrogen atoms to form a functional group with nitrogen bonding.

However, there is no a simple and efficient production method of nitrogen-doping porous graphene, and thus the present invention provides a simple and efficient production method of nitrogen-doping porous graphene: by fast increasing temperature and continuously injecting nitric oxide (NO) gas to make nitrogen-doping porous graphene by one step, and add it into activated carbon electrodes to make supercapacitor with high performance, e.g., high conductivity and capacitance. In addition, the method of the present invention can reduce remaining functional groups and simplify the steps for making supercapacitor with efficiency and convenience.

SUMMARY OF THE INVENTION

It is therefore an objective of the present invention to provide a supercapacitor. According to an embodiment of the present invention, the supercapacitor includes electrodes with activated material having nitrogen or phosphorus doping porous graphene, and organic electrolyte.

Further, an organic solvent for the organic electrolyte includes at least one of propylene carbonate (PC), acetonitrile (AN), N,N-dimethylformamide (NMP), Dimethylacetamide (DMA), tetrahydrofuran (THF); cations of the organic electrolyte include at least one of quaternary ammonium salt ($R_4N^+$), Lithium salts (Li+), quaternary phosphonium salt ($R_4P^+$), aromatic imidazolium salt (EMI); anions of the organic electrolyte include at least one of $CO_4^-$, $BF_4^-$, $PF_4^-$, $AsF_6^-$, $(CF_3SO_2)2NB^-$, tetraethyl ammonium tetrafluoroborate ($TEMABF_4$, TMABOB, TMADFOB).

Wherein, the activated material is applied to the conductive substrate by a scraper to deposing on the conductive substrate.

In summary, the supercapacitor of the present invention in which the nitrogen-doping porous graphene is applied to the organic electrolyte to reach better energy and power density performance. By adding the Nitrogen-doping porous graphene to the activated carbon electrode, an energy density and a power density performance of the supercapacitor may be improved. In the supercapacitor of the present invention, the energy density may reach 21 Wh/Kg, and the power density may reach 31 kW/Kg.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates proportions of carbon, oxygen, and nitrogen of graphene and Nitrogen-doping porous graphene.

FIG. 4 illustrates capacitances of activated carbon electrodes with graphene and capacitances of activated carbon electrodes with nitrogen-doping porous graphene under different current densities.

DETAILED DESCRIPTION

Figure 1:
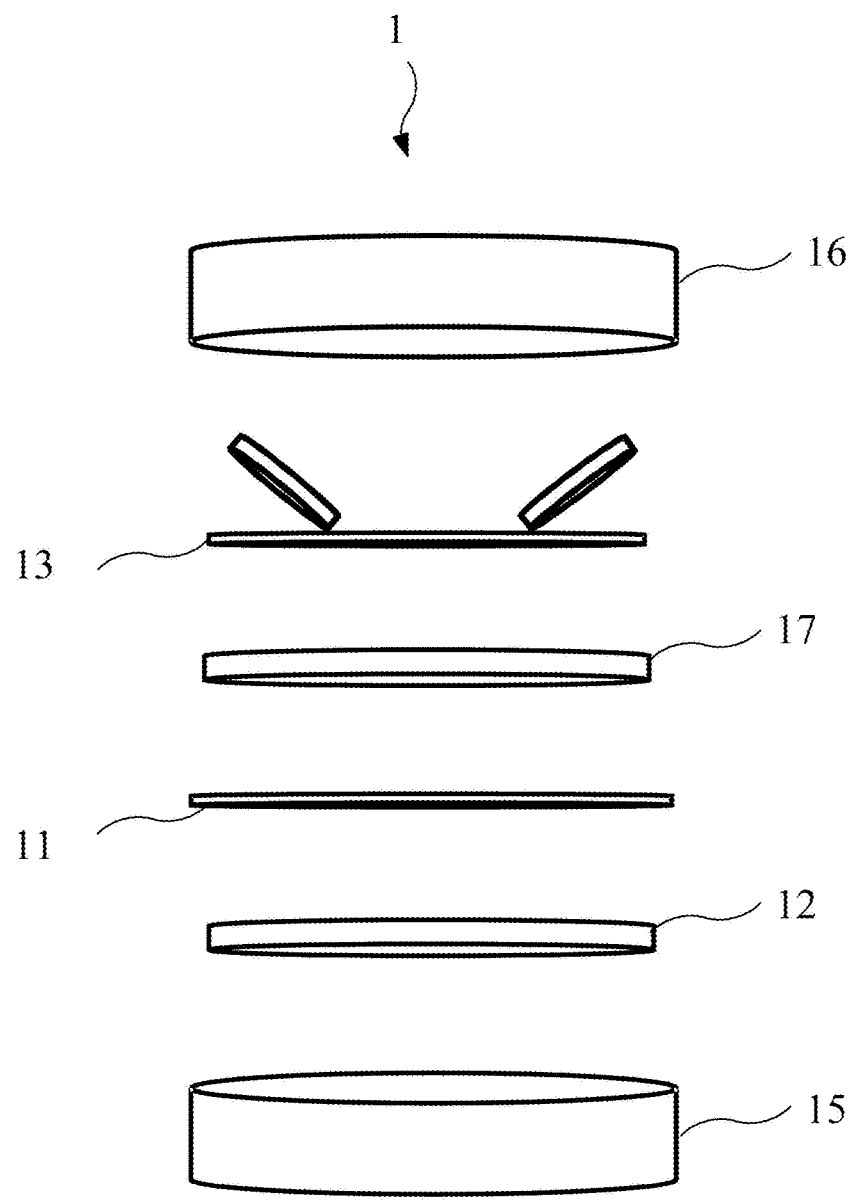
FIG. 1 is an explosion diagram of a coin cell according to an embodiment of the present invention.

Please refer to FIG. 1, which is an explosion diagram of a coin cell 1 according to an embodiment of the present invention. According to one embodiment of the present invention, the coin cell 1 of the present invention may be a supercapacitor with two electrodes, and include an upper cover 16, a spring lamination 13, a counter electrode 17, a separator 11, a working electrode 12, a lower cover 15 and an organic electrolyte (not shown in FIG. 1) contained within the upper cover 16 and the lower cover 15. The counter electrode 17, the separator 11, and the working electrode may form a supercapacitor, wherein the counter electrode 17, the separator 11, and the working electrode are soaked in the organic electrolyte.

The coin cell 1 may have a model name of CR2032, and be utilized for energy storage test. The working electrode 12 and the counter electrode 17 are made of aluminum applied with activated materials, i.e., the working electrode 12 and the counter electrode 17 may be made of the same materials and have a same shape, which is not limited. In another embodiment, the counter electrode 17 may be a conductive substrate, such as an aluminum substrate or stainless steel substrate. In another embodiment, the activated material on the conductive substrate may be such as non-nitrogen-phosphorus-doping porous graphene, nitrogen-doping porous graphene, phosphorus-doping porous graphene, porous graphene, graphene, carbon nanotube, activated carbon, and so on. The separator may be a cellulose membrane made by Nippon Kodoshi Corporation. The organic electrolyte may be 1M $TEABF_4$/PC.

In this embodiment, each part of the coin cell 1 may be processed individually before packaging. The upper cover 16, the lower cover 15 and the spring lamination 13 may be soaked in 95% alcohol for ultrasonic vibration cleaning for one hour before packaging, then baked in an oven with 80° C. under general atmosphere overnight. The aluminum substrate should be wiped and cleaned with alcohol.

In one embodiment, a production method of the working electrode 12 and the counter electrode 17 may include the following steps: step $S_{11}$: add an activated carbon, a nitrogen-doping porous graphene, a conductive black carbon, a thickener, an adhesive with a proportion of weight percentage 89.5:1.5:5:1.5:2.5, and add a proper amount of deionized water to uniformly grind and mix them to make a slurry. Step $S_{12}$: use a scraper to apply the slurry to the aluminum substrate, a thickness of the scraper may be 50 μm, and a scraping speed of the scraper may be 300 rpm. Step $S_{13}$: place the aluminum substrate applied with the slurry into an vacuum oven to bake with 90° C. for 3 hours, and then cool down, and divide the aluminum substrate applied with the slurry into the working electrode 12 and the counter electrode 17, in which an area of the working electrode 12 and the counter electrode 17 may be 1.33 $cm^2$. Wherein, the conductive black carbon may be a super P, the thickener may be carboxymethyl cellulose (CMC), the adhesive may be Styrene-butadiene copolymer (SBR), and a solvent may be the deionized water.

Afterwards, assemble each part of abovementioned in a glove box (under a protective environment) to make the supercapacitor with two electrodes. Before the working electrode 12 and the counter electrode 17 are placed into the glove box, the working electrode 12 and the counter electrode 17 are baked in a vacuum oven with 100 Celsius degrees for 3 hours and then cool down to remove water. After cooling down, the working electrode 12 and the counter electrode 17 are immediately transferred into the glove box. In the glove box, assemble the coin cell 1 with an order of the lower cover 15, the working electrode 12, the separator 11(meanwhile drop the electrolyte), the counter electrode 17, the spring lamination 13 and the upper cover 16 (as shown in FIG. 1).

Further, the assembled supercapacitor may be electrical activated. Conditions for electrical activation is to give a current density 1 A/g and a potential window 2.7 V to charge and discharge the supercapacitor from open electric potential with a fixed charging current, and such process is done after 3 cycles.

In addition, the abovementioned production method of the nitrogen-doping porous graphene may include the following steps: step S1: place graphite oxide (GO) into a furnace; step S2: inject Nitrous oxides with 50 c.c./min gas flow for 1 hour; step S3: heat up to 900° C. with a heat rate of 40° C./min for 1 hour, and then naturally cool down to room temperature to make the nitrogen-doping porous graphene.

In order to prove the performance of the nitrogen-doping porous graphene, the present invention further makes a graphene activated material as a control group. The production process of the graphene activated material is to perform heat process to the graphite oxide under a Nitrous oxides environment (50 sccm), while the heat rate and holding time are kept the same with the production process of the nitrogen-doping porous graphene. In addition, a proportion of the slurry and the process of making the working electrode is the same.

Further, a production process of a non-doping graphene may include the following steps: step S1: place graphite oxide (GO) into a furnace; step S2: inject Nitrous oxides with 50 c.c./min gas flow for 1 hour; step S3: heat up to 900° C. with a heat rate of 40° C./min for 1 hour, and then naturally cool down to the room temperature, thereby making the non-doping graphene.

The production process of the graphite oxide may include the following steps: step $S_{21}$: in a fume hood, mix and stir sulfuric acid and nitric acid in ice bath for 15 minutes, add natural graphite (99.999%, 150 mesh at least), and continuously stir for 15 minutes; step $S_{22}$: slowly add potassium perchlorate (which avoids violently oxidation reaction to cause fast heat up or solution splash), and then stir for 96 hours; step $S_{23}$: add 4 liters of deionized water to dilute the solution, filter the solution, and then clean the graphite with hydrochloric acid until there is no sulfate ions ($SO_4^{2-}$) in the solution; step $S_{24}$: clean the graphite with deionized water until the pH is 7, and then dry the graphite; step $S_{25}$: soak the graphite in 65% alcohol for 12 hours, filter the solution and clean the graphite with deionized water several times; step $S_{26}$: filter the solution and place the graphite in to an oven to bake with 90° C. for a night, thereby making a graphite oxide.

Please refer to FIG. 2, wherein an atomic percentage of carbon, oxygen, nitrogen of the nitrogen-doping porous graphene is 89:8:3.

Figure 3:
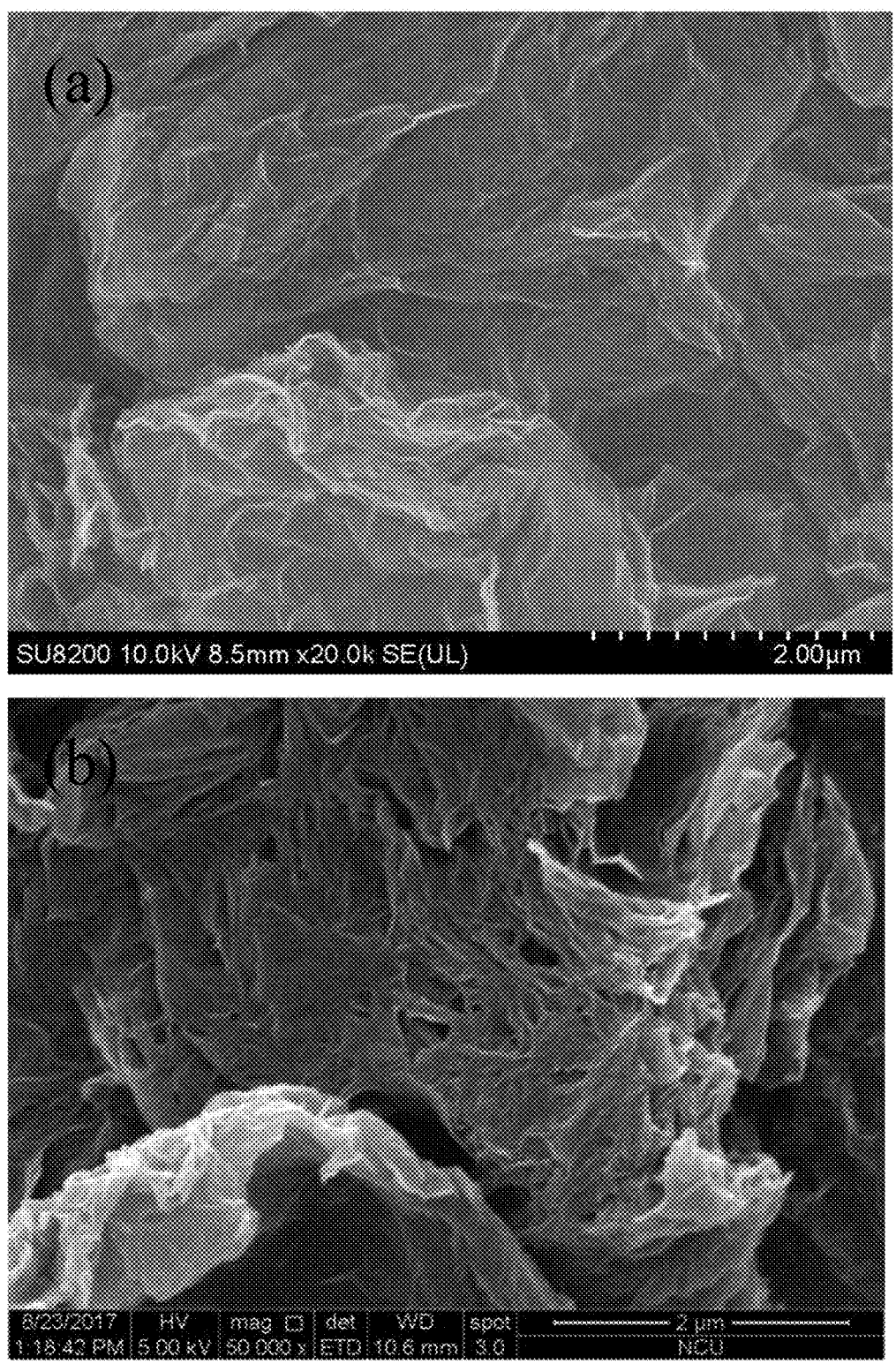
FIG. 3 illustrates surfaces of (a) graphene (b) Nitrogen-doping porous graphene.

Please refer to FIG. 3, wherein nitrogen-doping porous graphene presents fluffy shape, and there are many tiny holes on its surface.

An electrochemistry characteristics measurement of the present invention is made by potentiostat (made by Solartron) with timing potential measuring method, and a fixed potential window to 0-2.5 V is set. The potentiostat may output the fixed current, and an operator may record a variation of potential over time for the supercapacitor, so as to measure and evaluate the characteristics of the capacitor such as a capacitance, an energy density, and power density.

Please refer to FIG. 4, given that a charging and discharging condition of fixed current is 50 A/g, the nitrogen-doping porous graphene has a better performance than the non-doping graphene. A capacitance of non-doping porous graphene may be 18 F/g, while the capacitance of the nitrogen-doping porous graphene may reach 40 F/g. The superior charging and discharging characteristics of the nitrogen-doping porous graphene is due to that the nitrogen-doping may provide free electrons to increase a concentration of electrons to improve conductivity to achieve high speed charging and discharging performance. Given that the charging and discharging condition of the fixed current is 50 A/g, the power density may reach 31 kW/Kg.

Figure 5:
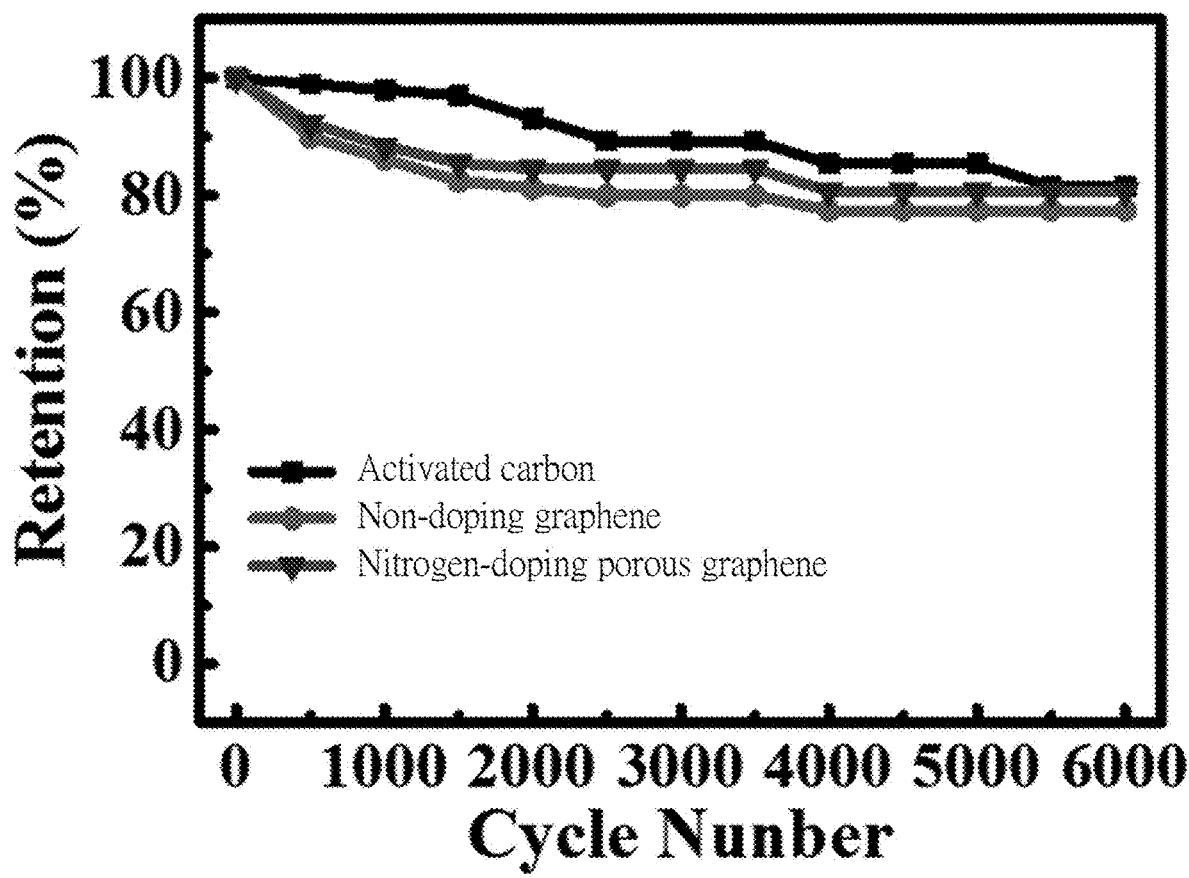
FIG. 5 illustrates a life cycle of activated carbon electrodes with graphene and a life cycle of activated carbon electrodes with nitrogen-doping porous graphene.

Please refer to FIG. 5, after 6000 cycles of charging and discharging to the activated carbon supercapacitor (AC), a maintenance rate of the capacitance of the AC is about 81%; while a maintenance rate of the capacitance of the activated carbon supercapacitor with non-doping graphene is 78%; a maintenance rate of the capacitance of the porous graphene activated carbon supercapacitor with nitrogen-doping is 81%. There is no significant influence to a cycle stability of the electrode material when the present invention adds minor graphene to the activated carbon supercapacitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A production method of supercapacitor, comprising:
    making an activated material with nitrogen-doping porous graphene;
    deposing the activated material on a conductive substrate to form a working electrode and a counter electrode;
    adsorbing organic electrolyte on surfaces of the working electrode and the counter electrode; and
    performing electrical activation to the working electrode which adsorbs the organic electrolyte.

2. The production method of claim 1, wherein an organic solvent for the organic electrolyte includes at least one of propylene carbonate (PC), acetonitrile (AN), N,N-dimethylformamide (NMP), Dimethylacetamide (DMA), tetrahydrofuran (THF).

3. The production method of claim 1, wherein cations of the organic electrolyte include at least one of quaternary ammonium salt ($R_4N^+$), Lithium salts (Li+), quaternary phosphonium salt ($R_4P^+$), aromatic imidazolium salt (EMI).

4. The production method of claim 1, wherein anions of the organic electrolyte comprises at least one of $CO_4^-$, $BF_4^-$, $PF_4^-$, $AsF_6^-$, $(CF_3SO_2)_2NB^-$, tetraethyl ammonium tetrafluoroborate ($TEMABF_4$, TMABOB, TMADFOB).

5. The production method of claim 1, wherein the activated material is applied to the conductive substrate by a scraper to be deposed on the conductive substrate.

6. The production method of claim 1, wherein making an activated material comprising nitrogen-doping porous graphene comprises:
    placing graphite oxide (GO) into a furnace and injecting a nitric oxide gas with 50 c.c./min gas flow for one hour; and
    increasing a temperature to 900 Celsius degrees with a rate of 40 Celsius degrees/min, after maintaining 900° C. for 1 hour, naturally cooling down to room temperature to form the activated material.

* * * * *